(12) United States Patent
Tokai

(10) Patent No.: US 8,035,700 B2
(45) Date of Patent: Oct. 11, 2011

(54) INFORMATION PROCESSING APPARATUS, REMOTE INDICATION SYSTEM, AND COMPUTER READABLE MEDIUM

(75) Inventor: Kiwame Tokai, Kanagawa (JP)

(73) Assignee: Fuji Xerox Co., Ltd., Tokyo (JP)

(*) Notice: Subject to any disclaimer, the term of this patent is extended or adjusted under 35 U.S.C. 154(b) by 416 days.

(21) Appl. No.: 12/389,398

(22) Filed: Feb. 20, 2009

(65) Prior Publication Data

US 2010/0045806 A1  Feb. 25, 2010

(30) Foreign Application Priority Data

Aug. 19, 2008 (JP) .................. 2008-211192

(51) Int. Cl.
*H04N 5/76* (2006.01)
*H04N 5/232* (2006.01)

(52) U.S. Cl. .................. 348/231.2; 348/211.1

(58) Field of Classification Search ............ 348/211.1, 348/211.2, 211.5, 207.1, 231.99, 231.2, 231.3
See application file for complete search history.

(56) References Cited

U.S. PATENT DOCUMENTS

| | | | |
|---|---|---|---|
| 7,333,989 | B1 | 2/2008 | Sameshima et al. |
| 2002/0122073 | A1* | 9/2002 | Abrams et al. ........... 345/838 |
| 2004/0070674 | A1 | 4/2004 | Foote et al. |
| 2005/0169605 | A1* | 8/2005 | Hung ..................... 386/95 |
| 2007/0171462 | A1* | 7/2007 | Shoya et al. ............ 358/1.15 |
| 2008/0240686 | A1* | 10/2008 | Nagaya et al. .......... 386/124 |

FOREIGN PATENT DOCUMENTS

| | | |
|---|---|---|
| JP | 10-269252 A | 10/1998 |
| JP | 2001-331661 A | 11/2001 |
| JP | 2002-034024 A | 1/2002 |
| JP | 2002-222138 A | 8/2002 |
| JP | 2002-259282 A | 9/2002 |
| JP | 2003-018573 A | 1/2003 |
| JP | 2003-058473 A | 2/2003 |
| JP | 2004-005526 A | 1/2004 |
| JP | 2005-033756 A | 2/2005 |
| JP | 2005-251125 A | 9/2005 |
| JP | 2005-322219 A | 11/2005 |
| JP | 2006-324763 A | 11/2006 |
| WO | 2005-008500 A1 | 1/2005 |

OTHER PUBLICATIONS

Japanese Patent Office Action dated Jun. 22, 2010 with English translation.

* cited by examiner

*Primary Examiner* — Kelly L Jerabek
(74) *Attorney, Agent, or Firm* — Sughrue Mion, PLLC

(57) ABSTRACT

An information processing apparatus including: a registration portion that, every time a new image is input, registers the image and an identifier with a storage; a reception portion that receives a delivery request including an identifier of an image and a delivery condition from an external terminal; a transmission portion that, when the identifier satisfying the delivery request is registered, transmits the image corresponding to the identifier to the external terminal; an addition portion that, when the identifier satisfying the delivery request is not registered, adds a set of the identifier, the delivery condition, identification information of the external terminal, and a registration time to the storage; and a notification portion that, when the identifier is not registered although a given period has passed from the registration time, notifies the external terminal of information showing that the image corresponding to the delivery request does not exist.

9 Claims, 10 Drawing Sheets

FIG. 3A

| REGISTRATION TIME | IMAGE ID | DELIVERY CONDITION | CLIENT IP |
|---|---|---|---|
| 10:00:01 | a0010 | IDENTITY | 192.168.1.5 |
| 10:01:12 | a0021 | NEW | 192.168.1.12 |
| 10:13:05 | — (TIME INFORMATION 11:00:00) | IMAGE ACQUIRED AFTER TIME SHOWN BY TIME INFORMATION HAS PASSED | 192.168.1.27 |
| ⋮ | ⋮ | ⋮ | ⋮ |

FIG. 3B

| IMAGE ID | IMAGE |
|---|---|
| a0001 | xyz0001.jpg |
| a0002 | xyz0002.jpg |
| ⋮ | ⋮ |

FIG. 10

| | APPLICATION FOR IMAGE RECEPTION REQUEST | |
|---|---|---|
| | IMAGE ID | CLIENT IP |
| 51 | a0010 | 192.168.1.5 | 52 |
| | | OK   CANCEL |

US 8,035,700 B2

INFORMATION PROCESSING APPARATUS, REMOTE INDICATION SYSTEM, AND COMPUTER READABLE MEDIUM

CROSS-REFERENCE TO RELATED APPLICATION

This application is based on and claims priority under 35 USC 119 from Japanese Patent Application No. 2008-211192 filed Aug. 19, 2008.

BACKGROUND

1. Technical Field

This invention relates to an information processing apparatus, a remote indication system, and a computer readable medium.

2. Related Art

There has been conventionally known a remote indication system including a server (e.g. a computer) with which a video camera and a projector are connected, and a client (e.g. a computer) of a remote place connected with the server via a network.

SUMMARY

According to an aspect of the present invention, there is provided an information processing apparatus including: a registration portion that, every time a new image is input, registers the image together with an identifier with a storage; a reception portion that receives a delivery request including an identifier of an image and a delivery condition from an external terminal; a transmission portion that, when the identifier that satisfies the delivery request received by the reception portion is registered with the storage, transmits the image corresponding to the identifier to the external terminal; an addition portion that, when the identifier that satisfies the delivery request received by the reception portion is not registered with the storage, adds a set of the identifier of the image, the delivery condition, identification information of the external terminal, and a registration time to the storage; and a notification portion that, when the identifier that satisfies the delivery request is not registered with the storage although a given time period has passed from the registration time, notifies the external terminal of information showing that the image corresponding to the delivery request does not exist.

BRIEF DESCRIPTION OF THE DRAWINGS

Exemplary embodiments of the present invention will be described in detail based on the following figures, wherein:

FIG. 3A is a diagram showing a waiting list stored into a HDD 34 in a delivery server 3;

FIG. 3B is a diagram showing a list of sets of an image and an image ID stored into the HDD 34 in the delivery server 3;

FIG. 10 is a diagram showing an example of an application for an image reception request.

DETAILED DESCRIPTION

A description will now be given, with reference to the accompanying drawings, of exemplary embodiments of the present invention.

Figure 1:
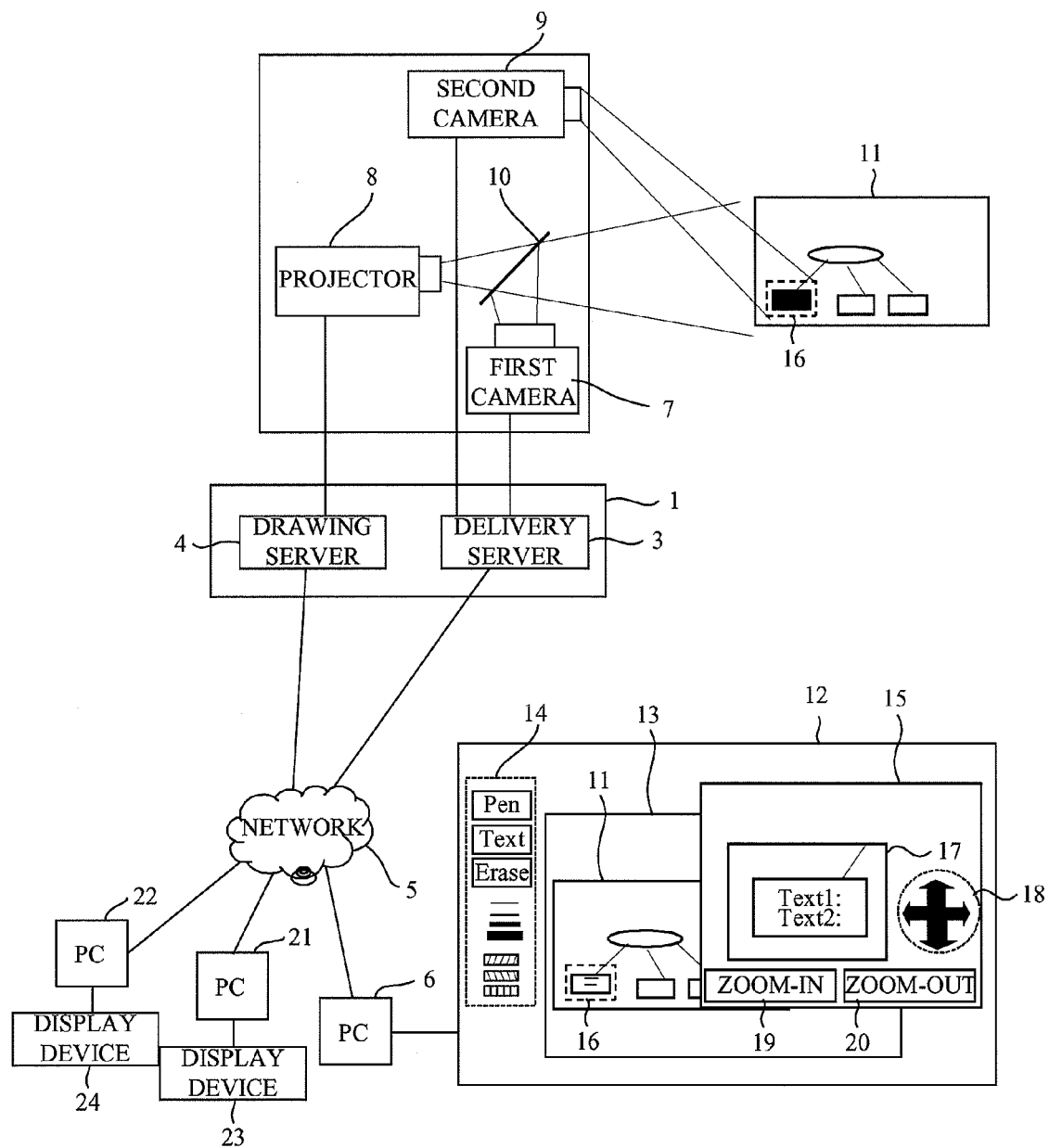
FIG. 1 is a block diagram showing the structure of a remote indication system in accordance with an exemplary embodiment of the present invention.

FIG. 1 is a block diagram showing the structure of a remote indication system in accordance with an exemplary embodiment of the present invention.

The remote indication system in FIG. 1 is provided with a server system 1 which is a first information processing apparatus, and personal computers (PC) 6, 21 and 22 functioning as clients which are second information processing apparatuses. These elements are connected to each other via a network 5. The server system 1 includes a delivery server 3 connected to a first camera 7 and a second camera 9, and a drawing server 4 connected to a projector 8. Based on a control command from the drawing server 4, the projector 8 emits light beams or projects an annotation image or the like onto an object 11 (e.g. a screen) via a half mirror 10. It should be noted that the annotation image includes an image of any types such as a line, a character, a symbol, a figure, a color, and a font.

The first camera 7 is composed of a video camera, captures a reflected image of the object 11 via the half mirror 10, and outputs the captured image to the delivery server 3. That is, the first camera 7 captures a whole image of the object 11. The half mirror 10 causes an angle of view and an optical axis of the first camera 7 to be identical with those of the projector 8.

The second camera 9 is composed of a network camera, or a PTZ (Pan-Tilt-Zoom) camera. A user of the object 11 side can move the second camera 9 freely. The second camera 9 outputs the captured image to the delivery server 3. Also, the second camera 9 is used to capture a part of the object 11. That is, the second camera 9 captures a part of the object 11.

The delivery server 3 stores the captured images of the first camera 7 and the second camera 9, and delivers the captured images of the first camera 7 and/or the second camera 9 to the PC 6 depending on a delivery request of the captured images from the PC 6. The drawing server 4 acquires the annotation image from the PC 6, and delivers the annotation image to the projector 8. Although the server system 1 is composed of a plurality of servers, the server system 1 may be composed of a single server having functions of the delivery server 3 and the drawing server 4.

A display device 12 is connected to the PC 6, and displays a first window 13 displaying the captured image of the first camera 7, a user interface (UI) 14 to write into the annotation image, and a second window 15 displaying the captured image of the second camera 9. The UI 14 includes a group of buttons such as a pen button, a text button, and an erase button, and icons defined by lines and colors. For example, when the pen button of the UI 14 is depressed to draw a figure or the like on the object 11 in the first window 13, data on the figure is output from the PC 6 to the projector 8 via the drawing server 4. The projector 8 draws the figure onto the object 11 based on the data on the figure.

Display devices 23 and 24 are connected to the PC 21 and 22, respectively. As is the case with the display device 12, each of the display devices 23 and 24 also displays the first window 13, the UI 14, and the second window 15.

In FIG. 1, the second window 15 displays a display area 17 which displays a object 16 as a part of the object 11, operation buttons 18, a zoom-in button 19, and a zoom-out button 20. The second window 15 is not always displayed, and is displayed on the display device 12 when a command, not shown, is input to the PC 6. When any one of the operation buttons 18 is depressed, the second camera 9 changes a capture direction according to a direction indicated by the depressed button. In this case, an image displayed on the display area 17 is also changed depending on the movement of the second camera 9. When the zoom-in button 19 or the zoom-out button 20 is depressed, the image displayed on the display area 17 is enlarged or reduced.

The PC 6 outputs a control command to the projector 8 via the drawing server 4 to control the brightness of images projected by the projector 8, and outputs control commands to the first camera 7 and the second camera 9 via the delivery server 3 to control the capture angles and the brightness of images captured by the first camera 7 and the second camera 9.

Figure 2:
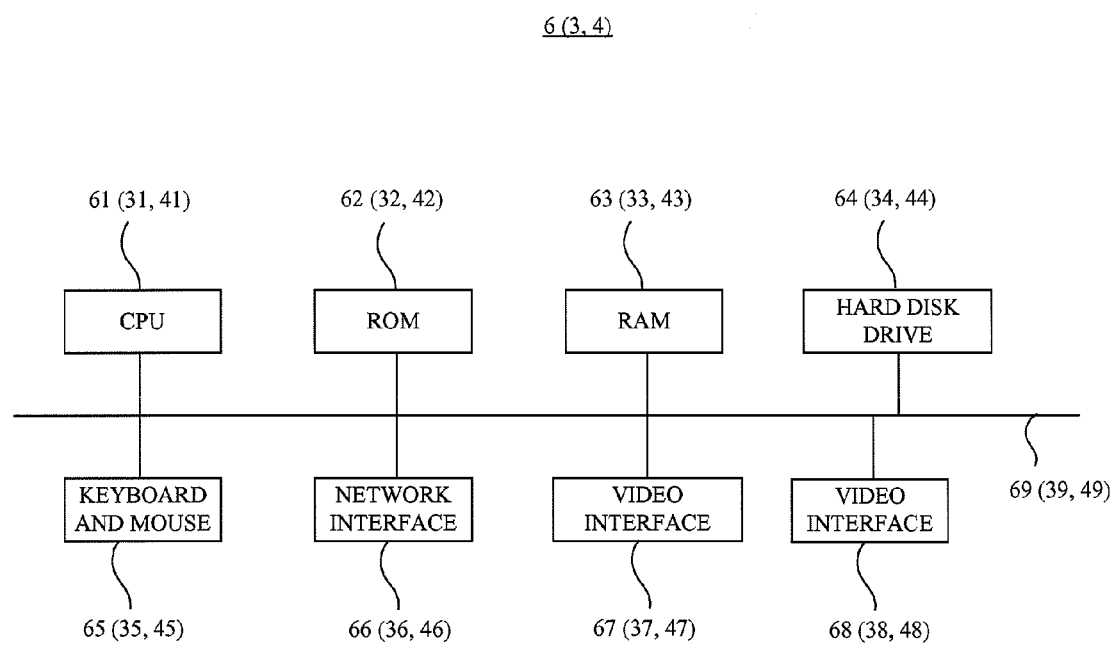
FIG. 2 is a block diagram showing the hardware structure of a PC 6.

FIG. 2 is a block diagram showing the hardware structure of the PC 6. Since the hardware structure of the PC 6 is the same as those of the PCs 21 and 22, the delivery server 3, and the drawing server 4, a description will now be given of the hardware structure of the PC 6 hereinafter. It should be noted that, in FIG. 2, the reference numerals 31 to 39 designate the elements of the delivery server 3, the reference numerals 41 to 49 designate the elements of the drawing server 4, and the reference numerals 61 to 69 designate the elements of the PC 6.

The PC 6 includes: a CPU 61 that controls the entire PC 6; a ROM 62 that stores control programs; a RAM 63 that functions a working area; a hard disk drive (HDD) 64 (a storing portion) that stores various information and programs; a mouse and keyboard 65; a network interface 66 that is connected to other computers; a video interface 67 (a display portion) that is connected to the display device; and a USB (Universal Serial Bus) interface 68 that is connected to a USB device, not shown. The CPU 61 is connected to the ROM 62, the RAM 63, the HDD 64, the mouse and keyboard 65, the network interface 66, the video interface 67 and the USB interface 68 via a system bus 69.

FIG. 3A is a diagram showing a waiting list stored into a HDD 34 in the delivery server 3, and FIG. 3B is a diagram showing a list of sets of an image and an image ID stored into the HDD 34 in the delivery server 3.

As shown in FIG. 3A, the waiting list includes a registration time in which an image delivery request from the client (i.e., the PC 6, 21, or 22) has been registered with the delivery server 3, an image ID indicative of an image that is an object of the image delivery request, a delivery condition for determining whether to deliver the image, a client IP indicating an output destination of the image delivery request. For example, the image delivery request described in a highest column in the waiting list is registered with the delivery server 3 at the registration time "10:00:01". When an image having the image ID which is identical with an image ID "a0010" is registered with the delivery server 3, the image delivery request requests that the delivery server 3 delivers the image to the client specified by an IP address "192.168.1.5".

The image delivery request described in a second highest column in the waiting list is registered with the delivery server 3 at the registration time "10:01:12". When an image having the image ID (e.g. "a0022", "a0023", or the like) which is newer than an image ID "a0021" is registered with the delivery server 3, the image delivery request requests that the delivery server 3 delivers the image to the client specified by an IP address "192.168.1.12". The image delivery request described in a third highest column in the waiting list is registered with the delivery server 3 at the registration time "10:13:05". In the image delivery request, time information "11:00:00" is included on the behalf of the image ID. The image delivery request requests that the delivery server 3 delivers the image acquired by the delivery server 3 after time shown by the time information has passed to the client specified by an IP address "192.168.1.27".

As shown in FIG. 3B, the delivery server 3 adds the image ID to the image, and stores the image together with the image ID into the HDD 34. The image ID increases sequentially one by one.

Figure 4:
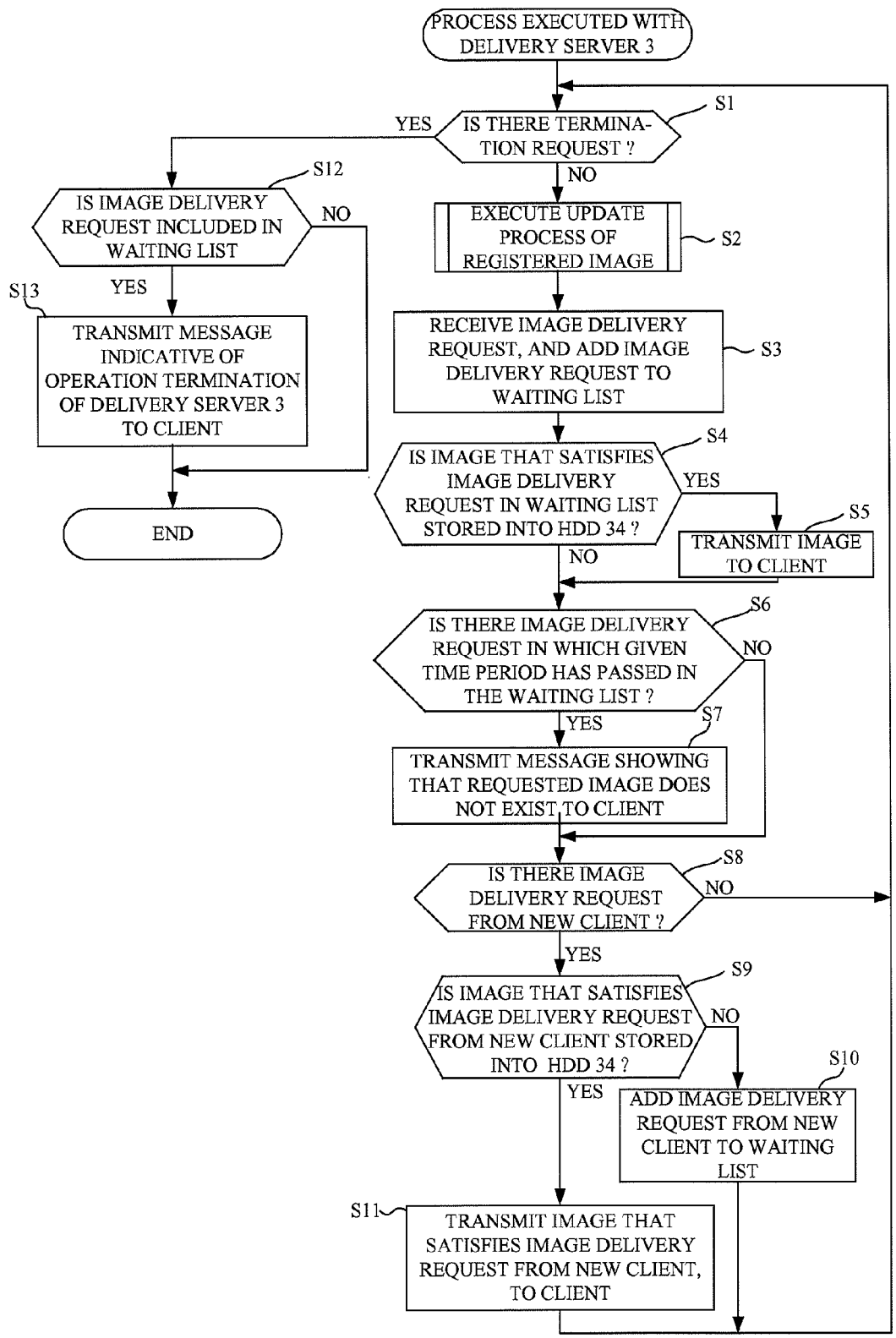
FIG. 4 is a flowchart showing a process executed with the delivery server 3.

FIG. 4 is a flowchart showing a process executed with the delivery server 3.

First, a CPU 31 of the delivery server 3 determines whether there is a termination request (e.g. a shutdown request of a power supply of the delivery server 3) (step S1). When the answer to the determination of step S1 is "NO", the CPU 31 executes an update process of a registered image (step S2). The update process of the registered image will be described later in detail.

Next, the CPU 31 receives the image delivery request from each client, and adds the image delivery request to the waiting list stored into the HDD 34 (step S3).

Next, the CPU 31 determines whether an image that satisfies the image delivery request in the waiting list is stored into the HDD 34 (step S4). The case that satisfies the image delivery request includes: (1) the case where the image ID of the image stored into the HDD 34 increases monotonously, and the image ID of the image stored into the HDD 34 is larger than the image ID included in the image delivery request; (2) the case where the image ID of the image stored into the HDD 34 is identical with the image ID included in the image delivery request; (3) the case where the time information is included in the image delivery request, and the image stored into the HDD 34 is acquired after time shown by the time information, and the like.

When the answer to the determination of step S4 is "YES", the CPU 31 transmits the image that satisfies the image delivery request to the client specified by the IP address included in the image delivery request (step S5), and the procedure proceeds to step S6. When the answer to the determination of step S4 is "NO", the CPU 31 determines whether there is the image delivery request in which a given time period has passed, in the waiting list (step S6).

When the answer to the determination of step S6 is "YES", the CPU 31 transmits a message showing that the requested image does not exist, to the client specified by the IP address included in the image delivery request (step S7), and the procedure proceeds to step S8. On the other hand, when the answer to the determination of step S6 is "NO", the procedure proceeds to step S8.

Next, the CPU 31 determines whether there is an image delivery request from a new client (step S8). When the answer to the determination of step S8 is "NO", the procedure returns to step S1. On the other hand, when the answer to the determination of step S8 is "YES", the CPU 31 determines whether an image that satisfies the image delivery request from the new client is stored into the HDD 34 (step S9). When the answer to the determination of step S9 is "YES", the CPU 31 transmits the image that satisfies the image delivery request from the new client, to the client specified by the IP address included in the image delivery request (step S11), and the procedure returns to step S1. On the other hand, when the answer to the determination of step S9 is "NO", the CPU 31 adds the image delivery request from the new client to the waiting list (step S10), and the procedure returns to step S1.

When the answer to the determination of step S1 is "YES", the CPU 31 determines whether the image delivery request is included in the waiting list (step S12). When the answer to the determination of step S12 is "YES", the CPU 31 transmits a message indicative of operation termination of the delivery server 3 to the client specified by the IP address included in the image delivery request (step S13), and then the present process is terminated. When the answer to the determination of step S12 is "NO", the present process is terminated.

Figure 5:
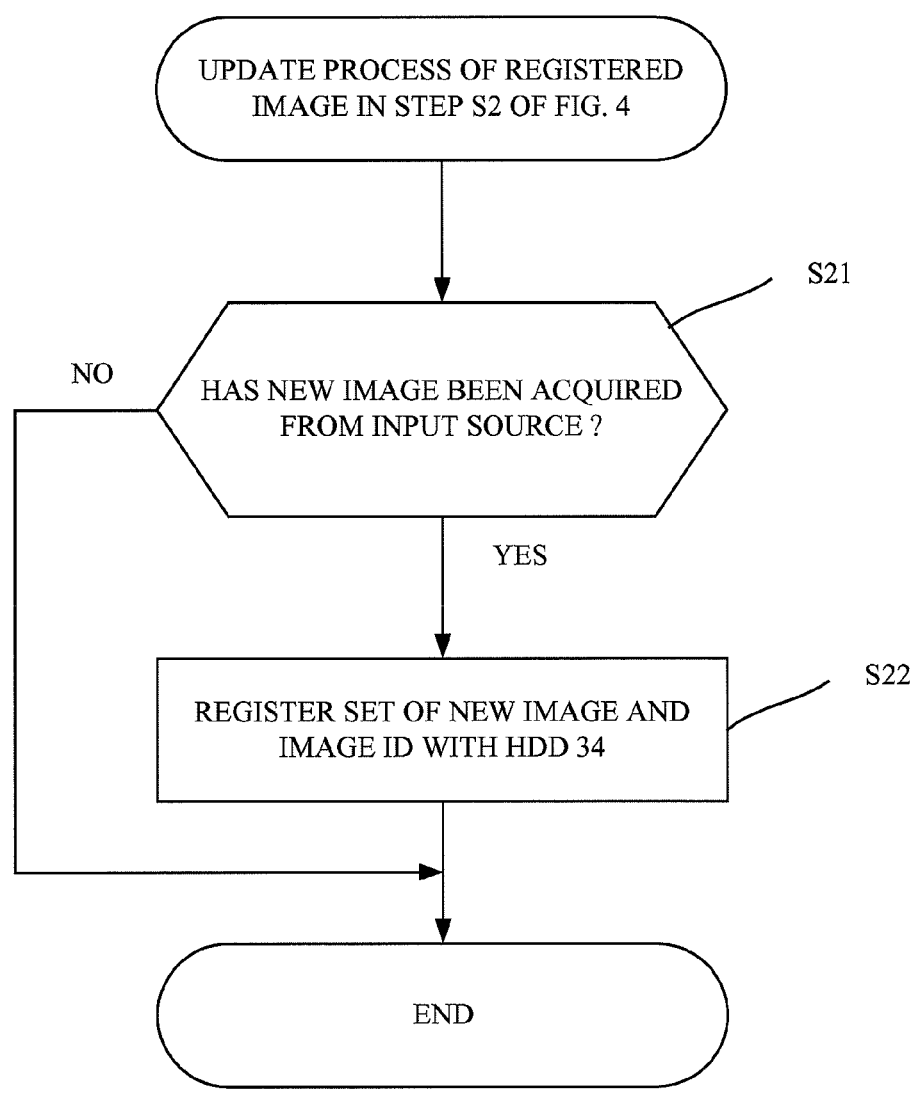
FIG. 5 is a flowchart showing an update process of a registered image in step S2 of FIG. 4.

FIG. 5 is a flowchart showing the update process of the registered image in step S2 of FIG. 4.

The CPU 31 of the delivery server 3 determines whether a new image has been acquired from an input source (step S21). Here, the input source indicates the first camera 7, the second camera 9, or the PC 6, 21, or 22. When the answer to the determination of step S21 is "NO", the present process is terminated. On the other hand, when the answer to the determination of step S21 is "YES", the CPU 31 registers a set of the new image and the image ID with the HDD 34 (step S22), and the present process is terminated.

Figure 6:
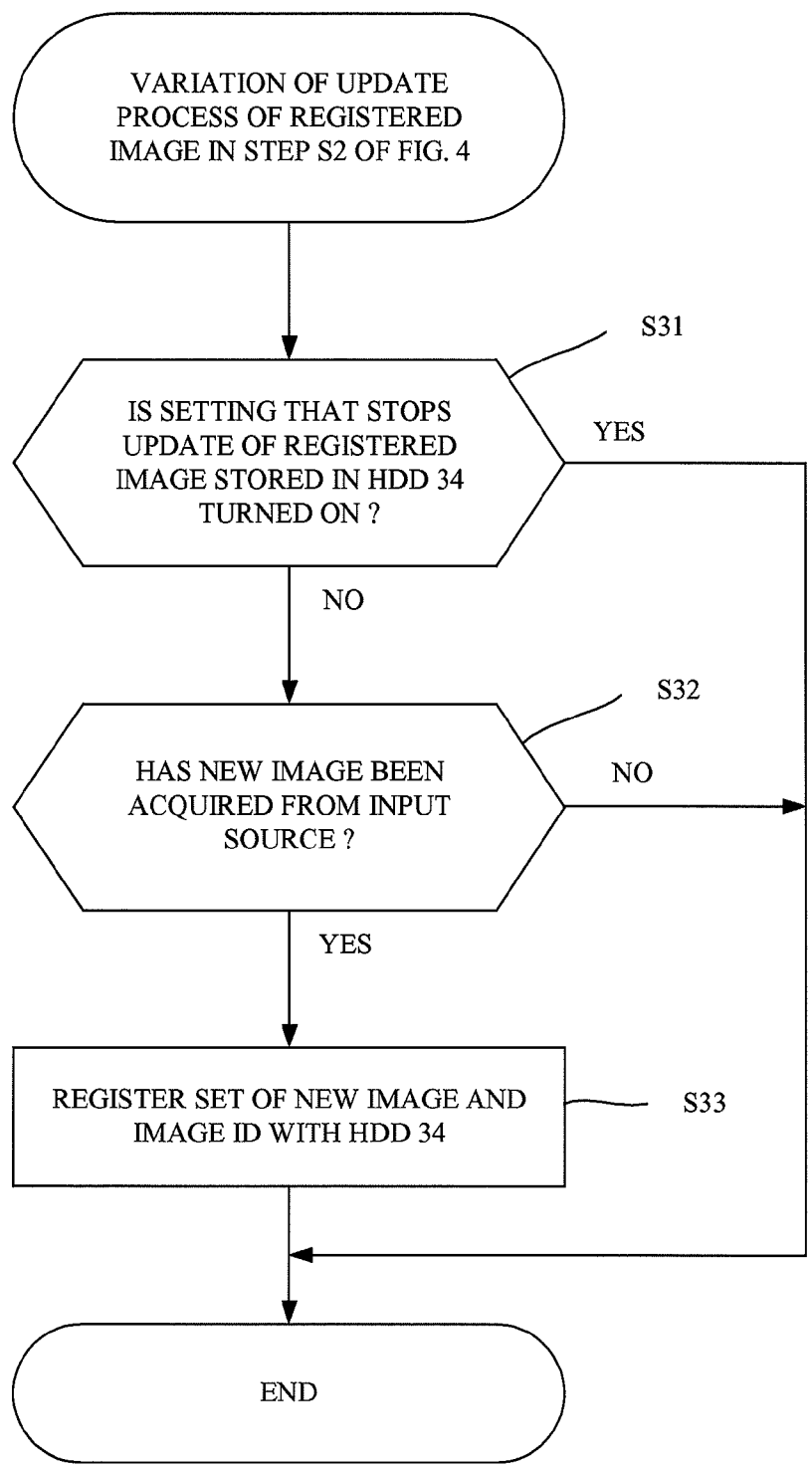
FIG. 6 is a flowchart showing a variation of the update process of the registered image in step S2 of FIG. 4.

FIG. 6 is a flowchart showing a variation of the update process of the registered image in step S2 of FIG. 4.

The CPU 31 of the delivery server 3 determines whether setting that stops the update of the registered image stored in the HDD 34 is turned on (step S31). The setting is executed by a control application of the delivery server 3 stored into the HDD 34. The selection of turning on or off the setting is executed with a keyboard or mouse (not shown) connected to the delivery server 3, or any one of the PCs 6, 21, and 22. When the answer to the determination of step S31 is "YES", the present process is terminated.

When the answer to the determination of step S31 is "NO", the CPU 31 determines whether a new image has been acquired from an input source (step S32). Here, the input source indicates the first camera 7, the second camera 9, or the PC 6, 21, or 22. When the answer to the determination of step S32 is "NO", the present process is terminated. On the other hand, when the answer to the determination of step S32 is "YES", the CPU 31 registers a set of the new image and the image ID with the HDD 34 (step S33), and the present process is terminated.

Figure 7:
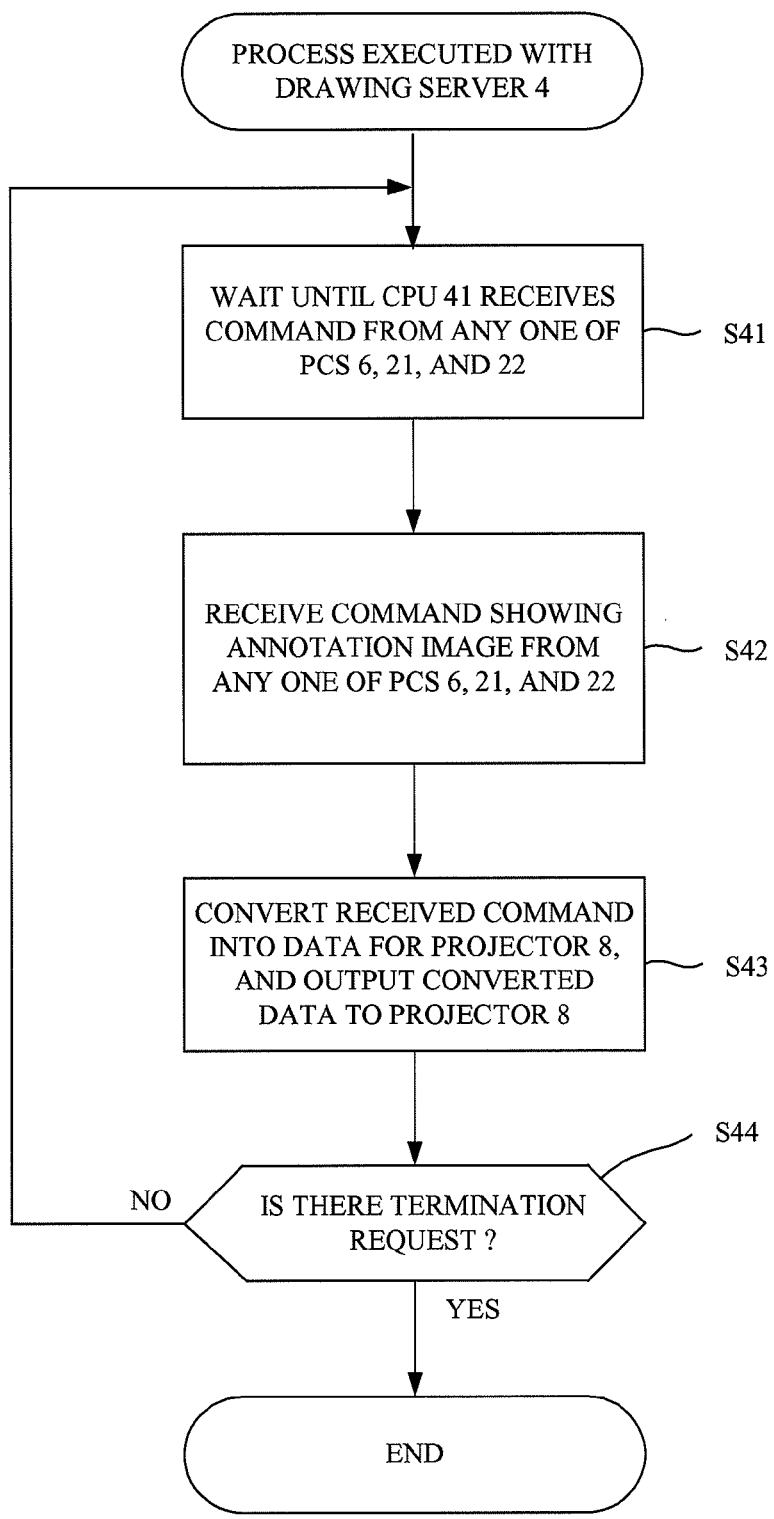
FIG. 7 is a flowchart showing a process executed with a drawing server 4.

FIG. 7 is a flowchart showing a process executed with the drawing server 4.

A CPU 41 of the drawing server 4 waits until the CPU 41 receives a command from any one of the PCs 6, 21, and 22 (step S41). The CPU 41 receives a command showing the annotation image from any one of the PCs 6, 21, and 22 (step S42). The CPU 41 converts the received command into data for the projector 8, and outputs the converted data to the projector 8 (step S43). The projector 8 projects the annotation image onto the object 11 based on the converted data.

Then, the CPU 41 determines whether there is a termination request (e.g. a shutdown request of a power supply of the drawing server 4) (step S44). When the answer to the determination of step S44 is "YES", the present process is terminated. On the other hand, when the answer to the determination of step S44 is "NO", the procedure returns to step S41.

Figure 8:
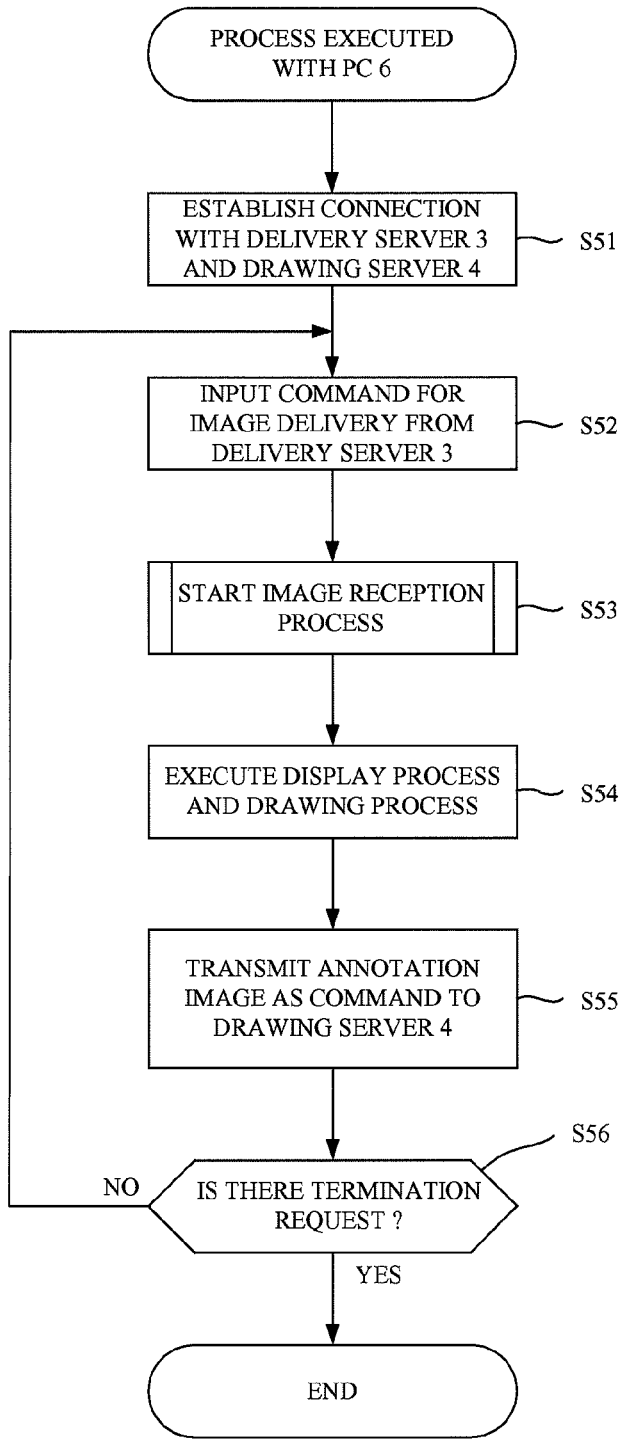
FIG. 8 is a flowchart showing a process executed with the PC 6.

FIG. 8 is a flowchart showing a process executed with the PC 6. It should be noted that the process in FIG. 8 is also executed with the PCs 21 and 22.

First, the CPU 61 of the PC 6 establishes connection with the delivery server 3 and the drawing server 4 (step S51).

Next, the CPU 61 inputs a command for image delivery from the delivery server 3 (step S52), and starts an image reception process (step S53). The image reception process will be described later in detail.

The CPU 61 executes a display process in which a received image is displayed on the first window 13 or the second window 15, and a drawing process in which the annotation image drawn by the UI 14 is reflected in the first window 13 (step S54). At this time, when the delivery server 3 returns a response showing that an image corresponding to the image delivery request does not exist to the PC 6, the CPU 61 displays a message showing that the image corresponding to the image delivery request does not exist, on the display device 12.

The CPU 61 transmits the annotation image drawn in the first window 13 as a command, to the drawing server 4 (step S55).

Then, the CPU 61 determines whether there is a termination request (e.g. a shutdown request of a power supply of the PC 6) (step S56). When the answer to the determination of step S56 is "YES", the present process is terminated. On the other hand, when the answer to the determination of step S56 is "NO", the procedure returns to step S52.

Figure 9:
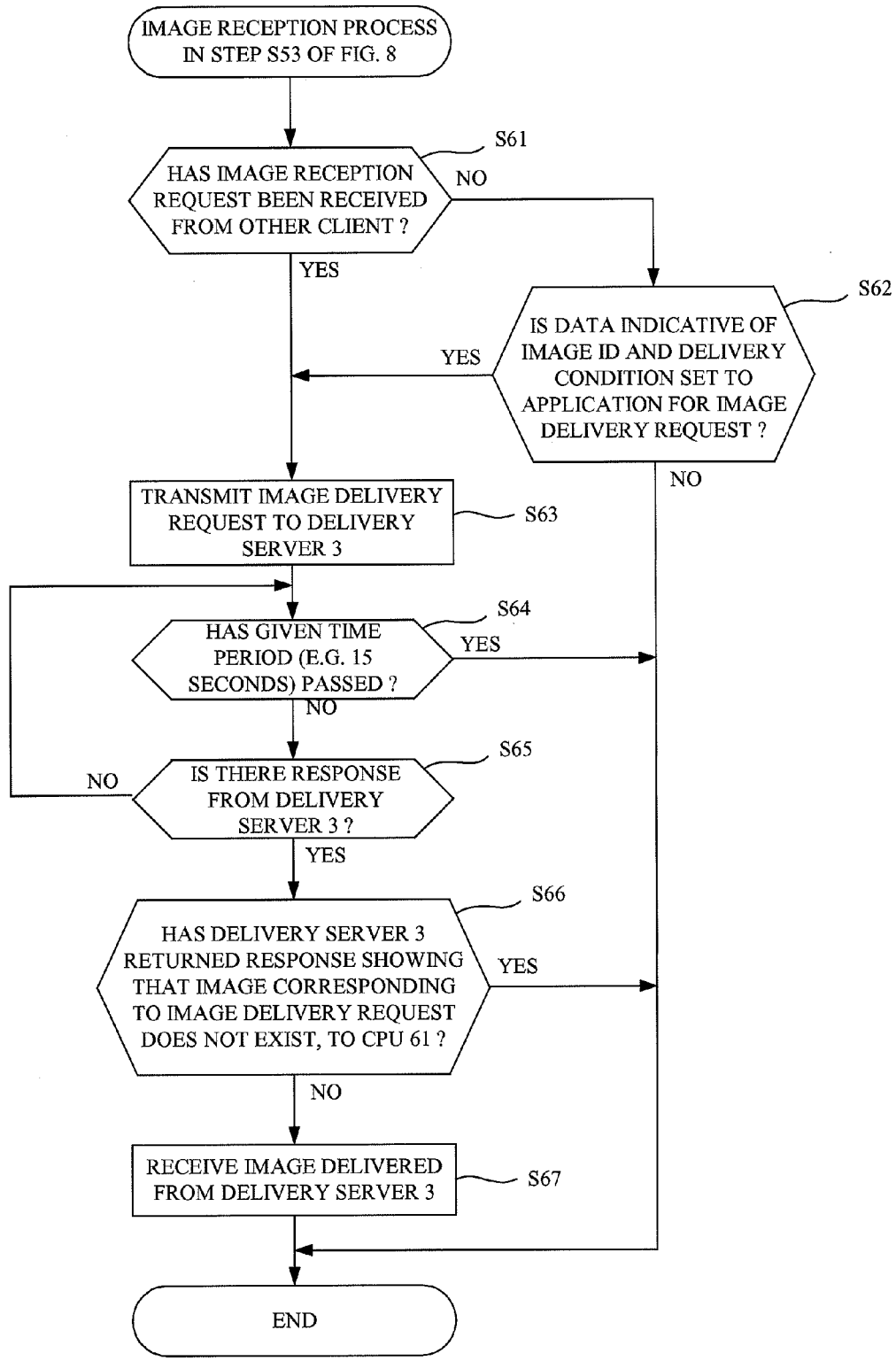
FIG. 9 is a flowchart showing in detail an image reception process in step S53 of FIG. 8.

FIG. 9 is a flowchart showing in detail the image reception process in step S53 of FIG. 8.

First, the CPC 61 of the PC 6 determines whether an image reception request has been received from other client (e.g. the PC 21 or the PC 22) (step S61). Data of the image ID to be registered with the waiting list in FIG. 3A is included in the image reception request.

When the answer to the determination of step S61 is "NO", the CPU 61 determines whether data indicative of the image ID and the delivery condition to be registered with the waiting list in FIG. 3A is set to an application for the image delivery request stored into the HDD 64, by a user of the PC 6 (step S62). When the answer to the determination of step S62 is "NO", the present process is terminated.

On the other hand, when the answer to the determination of step S61 or step S62 is "YES", the CPU 61 of the PC 6 transmits the image delivery request to the delivery server 3 (step S63) (a first transmission portion). When the answer to the determination of step S61 is "YES", the image ID included in the image reception request is included in the image delivery request. When the answer to the determination of step S62 is "YES", the data indicative of the image ID and the delivery condition set by the application for the image delivery request is included in the image delivery request.

Next, the CPU 61 determines whether a given time period (e.g. 15 seconds) has passed (step S64). During the given time period, the CPU 61 maintains a state where a response from the delivery server 3 can be received. When the answer to the determination of step S64 is "YES", the present process is terminated.

On the other hand, when the answer to the determination of step S64 is "NO", the CPU 61 determines whether there is the response from the delivery server 3 (step S65). When the answer to the determination of step S65 is "NO", the procedure returns to step S64. When the answer to the determination of step S65 is "YES", the CPU 61 determines whether the delivery server 3 has returned the response showing that the image corresponding to the image delivery request does not exist, to the CPU 61 (step S66). When the answer to the determination of step S66 is "YES", the present process is terminated. When the answer to the determination of step S66 is "NO", the CPU 61 receives the image delivered from the delivery server 3 (step S67), and the present process is terminated.

FIG. 10 is a diagram showing an example of an application for the image reception request.

The application for the image reception request is stored into each of the PCs 6, 21 and 22. The CPU of each of the PCs 6, 21 and 22 reads out the application for the image reception request from each HDD, and displays the application for the image reception request on the corresponding display device. In the application for the image reception request, the image which other client receives from the delivery server 3 is designated. For example, when an image ID "a0010" is input to an image ID field 51, an IP address "192.168.1.5" is input to an IP address field 52, and an OK button is depressed, as shown in FIG. 10, a request to receive an image corresponding to the image ID "a0010" from the delivery server 3 (i.e., the image reception request) is transmitted to the client specified by the IP address. The client specified by the IP address receives the image reception request, and transmits the image delivery request to the delivery server 3 as shown in step S63 of FIG. 9.

It should be noted that a plurality of image IDs can be input to the image ID field 51, and IP addresses of all clients can be input to the IP address field 52.

As described in detail above, according to the exemplary embodiment, the CPU 31 registers the new image together with the image ID with the HDD 34 every time the new image is input (step S22), and receives the image delivery request including the image ID and the delivery condition from the client (e.g. the PC 6) (step S3). When the image ID that satisfies the image delivery request received in step S3 is registered with the HDD 34, the CPU 31 transmits the image corresponding to the image ID to the client (step S5). When the image ID that satisfies the image delivery request received in step S3 is not registered with the HDD 34, the CPU 31 adds the set of the image ID, the delivery condition, the client IP, and the registration time to the waiting list stored into the HDD 34 (steps S3 and S10). Further, when the image ID that satisfies the image delivery request is not registered with the HDD 34 although the given time period has passed from the registration time, the CPU 31 notifies the client of information showing that the image corresponding to the image delivery request does not exist (step S7).

Thus, when the new image is input, the change of the image occurs, and an identifier (i.e., the image ID) that satisfies the image delivery request is registered with the HDD 34, the image corresponding to the identifier (i.e., the image ID) is transmitted to the client. When the change of the image dose not occur, or the identifier (i.e., the image ID) that satisfies the image delivery request is not registered with the HDD 34 although the change of the image occurs, the information showing that the image corresponding to the image delivery request does not exist is notified to the client (step S7). Therefore, it is evaded to cause uselessness in the communication traffic, and a user of an external terminal knows that a desired image does not occur.

It should be noted that a registration portion, a reception portion, a transmission portion, an addition portion, a notification portion, a stop portion, a second transmission portion, and a designation portion are realized with the CPU 31 of the delivery server 3.

A recording medium on which the software program for realizing the functions of the delivery server 3 is recorded may be supplied to the delivery server 3, and the CPU 31 may read and execute the program recorded on the recording medium. In this manner, the same effects as those of the above-described exemplary embodiment can be achieved. The recording medium for providing the program may be a CD-ROM, a DVD, or a SD card, for example.

Alternatively, the CPU 31 of the delivery server 3 may execute a software program for realizing the functions of the delivery server 3, so as to achieve the same effects as those of the above-described exemplary embodiment.

It should be noted that the present invention is not limited to those exemplary embodiments, and various modifications may be made to them without departing from the scope of the invention.

What is claimed is:

1. An information processing apparatus comprising:
  a registration portion that, every time a new image is input, registers the image together with an identifier with a storage;
  a reception portion that receives a delivery request including an identifier of an image and a delivery condition from an external terminal;
  a transmission portion that, when the identifier that satisfies the delivery request received by the reception portion is registered with the storage, transmits the image corresponding to the identifier to the external terminal;
  an addition portion that, when the identifier that satisfies the delivery request received by the reception portion is not registered with the storage, adds a set of the identifier of the image, the delivery condition, identification information of the external terminal, and a registration time to the storage; and
  a notification portion that, when the identifier that satisfies the delivery request is not registered with the storage although a given time period has passed from the registration time, notifies the external terminal of information showing that the image corresponding to the delivery request does not exist.

2. The information processing apparatus according to claim 1, wherein the delivery condition is any one of the case where the identifier registered with the storage increases monotonously, and the identifier is larger than the identifier included in the delivery request, and the case where the identifier registered with the storage is identical with the identifier included in the delivery request.

3. The information processing apparatus according to claim 2, further comprising a stop portion that stops registering the image together with the identifier with the storage.

4. The information processing apparatus according to claim 1, wherein time information is included in the delivery request, and the delivery condition is the case where the image registered with the storage is acquired after time shown by the time information.

5. The information processing apparatus according to claim 4, further comprising a stop portion that stops registering the image together with the identifier with the storage.

6. The information processing apparatus according to claim 1, further comprising a stop portion that stops registering the image together with the identifier with the storage.

7. A remote indication system comprising:
  a second information processing apparatus including:
  a first transmission portion that transmits a delivery request including an identifier of an image and a delivery condition to a first information processing apparatus; and
  a display portion that displays an image transmitted from the first information processing apparatus, and information showing that an image corresponding to the delivery request does not exist, on a display device; and
  a first information processing apparatus including:
  a registration portion that, every time a new image is input, registers the image together with an identifier with a storage;
  a reception portion that receives the delivery request from the second information processing apparatus;

a transmission portion that, when the identifier that satisfies the delivery request received by the reception portion is registered with the storage, transmits the image corresponding to the identifier to the second information processing apparatus;

an addition portion that, when the identifier that satisfies the delivery request received by the reception portion is not registered with the storage, adds a set of the identifier of the image, the delivery condition, identification information of the second information processing apparatus, and a registration time to the storage; and a notification portion that, when the identifier that satisfies the delivery request is not registered with the storage although a given time period has passed from the registration time, notifies the second information processing apparatus of the information showing that the image corresponding to the delivery request does not exist.

8. The remote indication system according to claim 7, wherein the remote indication system includes a plurality of second information processing apparatuses, each of the second information processing apparatuses includes a designation portion that designates an image which other second information processing apparatus receives from the first information processing apparatus.

9. A computer readable medium causing a computer to execute a process, the process comprising:

registering, every time a new image is input, the image together with an identifier with a storage;

receiving a delivery request including an identifier of an image and a delivery condition from an external terminal;

transmitting, when the identifier that satisfies the delivery request is registered with the storage, the image corresponding to the identifier to the external terminal;

adding, when the identifier that satisfies the delivery request is not registered with the storage, a set of the identifier of the image, the delivery condition, identification information of the external terminal, and a registration time to the storage; and notifying, when the identifier that satisfies the delivery request is not registered with the storage although a given time period has passed from the registration time, the external terminal of information showing that the image corresponding to the delivery request does not exist.

* * * * *